US011933325B1

(12) United States Patent
Miftakhov

(10) Patent No.: US 11,933,325 B1
(45) Date of Patent: Mar. 19, 2024

(54) THERMAL PUMPING OF LIQUID HYDROGEN

(71) Applicant: ZeroAvia, Inc., Hollister, CA (US)

(72) Inventor: Valery Miftakhov, San Carlos, CA (US)

(73) Assignee: ZEROAVIA, INC., Hollister, CA (US)

( * ) Notice: Subject to any disclaimer, the term of this patent is extended or adjusted under 35 U.S.C. 154(b) by 0 days.

(21) Appl. No.: 18/448,806

(22) Filed: Aug. 11, 2023

(51) Int. Cl.
*F04F 1/18* (2006.01)
*F15B 1/04* (2006.01)

(52) U.S. Cl.
CPC . *F04F 1/18* (2013.01); *F15B 1/04* (2013.01)

(58) Field of Classification Search
CPC ...................................... F04F 1/18; F15B 1/04
See application file for complete search history.

(56) References Cited

U.S. PATENT DOCUMENTS 8,950,195 B2 * 2/2015 Watts ..................... B64D 37/02 62/48.2
8,950,198 B2 * 2/2015 Cording .................. F25B 45/00 62/149
10,654,592 B2 * 5/2020 Mata ........................ B64G 1/42
11,560,234 B2 * 1/2023 Morrison .......... H01M 8/04029
11,575,138 B1 * 2/2023 Miftakhov ........ H01M 8/04014
11,608,938 B2 * 3/2023 Ku ............................ C25B 1/04
11,724,815 B2 * 8/2023 Mackin .................. B64D 47/00 60/801
2010/0304228 A1 * 12/2010 Majarov ........... H01M 8/04067 429/408
2017/0233111 A1 * 8/2017 Mata ................. H01M 8/04208 244/171.1
2020/0102101 A1 * 4/2020 Mata ................. H01M 8/04701
2022/0052361 A1 * 2/2022 Morrison ............... B64D 27/24
2022/0297844 A1 * 9/2022 Mackin ...................... F02C 6/20
2022/0302477 A1 * 9/2022 Landolt .................. B64D 37/32
2023/0117737 A1 * 4/2023 Miftakhov ................ B64B 1/00 244/30

FOREIGN PATENT DOCUMENTS

WO WO-2022035968 A1 * 2/2022 ............. B60L 50/72

* cited by examiner

*Primary Examiner* — Paul R Durand
*Assistant Examiner* — Michael J. Melaragno
(74) *Attorney, Agent, or Firm* — HAYES SOLOWAY P.C.

(57) ABSTRACT

A liquid hydrogen ($LH_2$) fuel storage system for a fuel cell-powered vehicle, and method includes a main $LH_2$ storage fuel tank configured for close to ambient pressure storage of $LH_2$, and one or more gas accumulator tanks (GATs) smaller than the main $LH_2$ storage fuel tank and configured for elevated pressure storage of $LH_2$ and for feeding pressurized $LH_2$ to the fuel cell, wherein the one or more GATs each have a cooling interface configured to cool the GAT employing $LH_2$ from the main $LH_2$ storage fuel tank, and a heating interface configured to heat contents of the GAT with warm working fluid from the fuel cell-powered vehicle whereby to raise pressure of the $LH_2$ in the GAT to a working pressure for feeding the $LH_2$ to the fuel cell.

14 Claims, 3 Drawing Sheets

THERMAL PUMPING OF LIQUID HYDROGEN

TECHNICAL FIELD

The present disclosure relates to hydrogen fuel cell electric engine systems for use with aircraft and will be described in connection with such utility, although other utilities are contemplated.

BACKGROUND AND SUMMARY

This section provides background information related to the present disclosure which is not necessarily prior art. This section provides a general summary of the disclosure and is not a comprehensive disclosure of its full scope or all its features.

Exhaust emissions from transport vehicles are a significant contributor to climate change. Conventional fossil fuel-powered aircraft engines release $CO_2$ emissions. Also, fossil fuel-powered aircraft emissions include non-$CO_2$ effects due to nitrogen oxide (NOx), vapor trails, and cloud formation triggered by the altitude at which aircraft operate. These non-$CO_2$ effects are believed to contribute twice as much to global warming as aircraft $CO_2$ and are estimated to be responsible for two-thirds of aviation's climate impact. Additionally, the high-speed exhaust gases of conventional fossil fuel-powered aircraft engines contribute significantly to the extremely large noise footprint of commercial and military aircraft, particularly in densely populated areas.

Rechargeable battery-powered, terrestrial vehicles, i.e., "EVs", are slowly replacing conventional fossil fuel-powered terrestrial vehicles. However, the weight of batteries and limited energy storage of batteries makes rechargeable battery-powered aircraft generally impractical.

Hydrogen fuel cells offer an attractive alternative to fossil fuel-burning engines. Hydrogen fuel cell tanks may be quickly filled and store significant energy, and other than the relatively small amount of unreacted hydrogen gas, the reaction output exhausted from hydrogen fuel cells comprises essentially only water. However, storage of liquid hydrogen ($LH_2$) under conditions suitable for use in feeding a hydrogen fuel cell presents a challenge, particularly in the case of aircraft.

$LH_2$ storage allows high potential mass fractions of $H_2$ as a percentage of the total system weight (tank+fuel), up to 40% in the lightweight composite cryogenic storage dewar structures appropriate for an aircraft. However, the lightweight cryogenic storage dewar structures desirable for aviation are rated only for close to ambient pressure of $LH_2/H_2$ gas mix inside the tank—which generally is incompatible with driving a fuel cell directly from such a $LH_2/H_2$ gas mix due to a typical fuel cell requiring 5-10 bar gas pressure input. $LH_2$ storage tanks rated to 5-10 bar are 2-3 times heavier than the ones designed for close to ambient pressure storage, thereby negating a significant part of the mass advantage of $LH_2$ storage for aircraft.

In order to overcome the aforesaid and other problems of the prior art, we provide an $LH_2$ storage system comprising a primary tank configured for close to ambient pressure storage, and one or more small, high-pressure, gas accumulator tanks (GATs) rated for, e.g., 5-10 bar or more gas pressure for feeding a fuel cell. The primary tank may be formed as a relatively light-weight composite structure designed to store $LH_2/H_2$ gas mixture at close to ambient pressure and sized to store sufficient $LH_2$ to provide a desired operating range of the aircraft. Also, being designed to operate at close to ambient pressure, the primary tank may be shaped to fit within the wings or fuselage of the aircraft.

In accordance with the present disclosure, we provide one or more small GATs with a thermal pumping system to provide the necessary conditioning to raise the pressure of the $LH_2$ gas for use as a fuel cell feed. Preferably two or more GATs are provided, operating out-of-phase with one another to provide an uninterrupted supply of $LH_2$ pressurized for use as a fuel cell feed.

The overall system employs a thermal pumping scheme and operates as follows: one of the GATs is cooled by circulating $LH_2$ from the main tank through a cooling interface on the GAT. Cooling the GAT lowers the temperature within the GAT and creates a vacuum in the GAT. $LH_2$ is then delivered from the main tank into the cooled GAT via an inlet conduit valve. The $LH_2$ may be delivered via gravity, pumping or pulled into the GAT by vacuum, or via a combination of two or more of gravity, pumping and vacuum. The inlet valve is then closed, and the contents of the GAT are heated by heating the tank via a heating interface which is heated by heat from the aircraft propulsion system. By way of example but not limitation, the heat may be provided by heat exchanger with coolant from the vehicle propulsion system downstream of the propulsion system turbine. As another example, the heat may be supplied by heat exchanger with the fuel cell cathode exhaust. Heating the GAT increases the pressure in the tank due both to evaporation of the $LH_2$ into $H_2$ gas and thermodynamic gas pressure. The $LH_2$ is then delivered at elevated pressure to a downstream gasifier for feed to the fuel cell. In a preferred embodiment, a second GAT is provided comprising a second GAT, equipped with cooling and heating interfaces, valves, etc., and configured to operate in parallel but out-of-phase with the first GAT which permits us to provide an uninterrupted supply of $LH_2$ at a desired pressure to the fuel cell gasifier.

More particularly, in accordance with a preferred embodiment of the present disclosure, there is provided a $LH_2$ storage system for an aircraft comprising a main $LH_2$ tank configured to operate at or near ambient pressure and two or more GATs configured to raise the pressure of the $LH_2$ within the GATs for use as a fuel cell feed rise. An increased pressure, typically 5-10 bar, is achieved and maintained by a thermal pumping scheme utilizing heat flow within the GAT. An interface between the main $LH_2$ tank and GATs comprises a simple $LH_2$ valve allowing gravity or pump- and/or vacuum-assisted flow of ambient pressure $LH_2$ from the main $LH_2$ tank into the GATs. The GATs each are equipped with two thermal interfaces—a cooling interface configured to allow $LH_2$ from the main tank to selectively cool the GATs in sequence, and a heating interface allowing warm working liquid/gas (e.g., excess heat from the aircraft propulsion system) to selectively heat the contents of the GATs in sequence) to raise the pressure of the $LH_2$ in the GATs to a working pressure, e.g., to 5 to 10 bar, for feed to the fuel cells.

In a preferred embodiment, the system works in the following cycle:

1. A first GAT, GAT-1, is cooled by contact with a cooling interface which is cooled by $LH_2$ from the main tank. As the tank is cooled, the interior pressure within the GAT drops.
2. Once the pressure in GAT-1 drops below the $LH_2$ tank pressure, an inlet valve is opened to permit $LH_2$ to flow into GAT-1. The $LH_2$ flows into GAT-1 by the force of gravity or is pumped into GAT-1 or pulled into GAT-1 via vacuum or a combination of two or more of gravity, pumping and vacuum. An amount of $LH_2$ is introduced to partially fill GAT-1, and the GAT-1 inlet valve is closed.
3. GAT-1 heating interface is then activated by circulating hot fluid from the aircraft propulsion system, causing GAT-1 to heat up, increasing the pressure in GAT-1 due to both evaporation of $LH_2$ into $H_2$ gas and thermodynamic gas pressure rise due to temperature increase. A desired elevated pressure of 5 to 10 bar is achieved and maintained via control of the heat flow into GAT-1.
4. The GAT-1 outlet valve is opened to allow flow of $LH_2$ under elevated pressure to a gasifier supplying the fuel cell.
5. While GAT-1 is supplying the fuel cell with pressurized $LH_2$, a second GAT, GAT-2, undergoes a similar pressure charging cycle as described above.
6. Once the GAT-1 hydrogen contents are depleted or close to depletion, the GAT-1 outlet valve is closed, and GAT-1 is again chilled, refilled and pressurized with $LH_2$ and repressurized as before.
7. While GAT-1 is being chilled, refilled and pressurized, GAT-2 becomes the primary source of $H_2$ for the fuel cell, and the cycle repeats.

According to Aspect A, there is provided a liquid hydrogen ($LH_2$) fuel storage system for a fuel cell-powered vehicle, comprising a main $LH_2$ storage fuel tank configured for close to ambient pressure storage of $LH_2$, and one or more gas accumulator tanks (GATs) smaller than the main fuel tank and configured for elevated pressure storage of $LH_2$ and for feeding pressurized $LH_2$ to the fuel cell, wherein the one or more GATs each have a cooling interface configured to cool the GAT employing $LH_2$ from the main fuel tank, and a heating interface configured to heat contents of the GAT with warm working fluid from the fuel cell-powered vehicle whereby to raise pressure of the $LH_2$ in the GAT to a working pressure for feeding the $LH_2$ to the fuel cell.

According to one embodiment, the main $LH_2$ storage fuel tank comprises a composite structure.

In another embodiment the vehicle is an airplane.

In yet another embodiment, the $LH_2$ fuel storage system comprises two or more GATs configured to run out-of-phase with one another.

In a further embodiment the working pressure is 5-10 bar.

In a still further embodiment, the warm working fluid comprises coolant from a vehicle propulsion system.

In yet another embodiment, the warm working fluid comprises cathode exhaust from the fuel cell.

According to Aspect B, there is provided a method for providing liquid hydrogen ($LH_2$) fuel to a fuel cell-powered vehicle, comprising the steps of:

(a) providing $LH_2$ fuel storage system as above described, the system including a main $LH_2$ storage fuel tank configured for close to ambient pressure storage of $LH_2$, and one or more gas accumulator tanks (GATs) smaller than the main fuel tank and configured for storage of $LH_2$ and feeding of pressurized $LH_2$ to the fuel cell;

(b) cooling the one or more GATs by heat transfer with $LH_2$ from the main $LH_2$ storage fuel tank;

(c) transferring a quantity of $LH_2$ from the main $LH_2$ storage fuel tank to a cooled GAT, and raising pressure of the $LH_2$ in the cooled GAT to a working pressure suitable for feeding the fuel cell by heat transfer with warm working fluid from the fuel cell-powered vehicle; and (d) feeding the $LH_2$ at working pressure to the fuel cell.

In one embodiment of the method two or more GATs are provided, wherein steps (a), (b), (c) and (d) are sequentially applied to the two or more GATs out-of-phase with one another.

In another embodiment of the method each GAT is first cooled by thermal transfer with $LH_2$ from the main $LH_2$ storage tank, a quantity of $LH_2$ is then transferred from the main $LH_2$ storage fuel tank to the cooled GAT, and the contents of the cooled GAT heated by heat exchange with warm working fuel from the vehicle propulsion system, whereby to raise a pressure of the $LH_2$ in the GAT to a working pressure, and the $LH_2$ is delivered to the fuel cell at working pressure.

In a further embodiment of the method the vehicle comprises an aircraft.

In still yet another embodiment of the method the working pressure is 5 to 10 bar.

In another embodiment of the method the warm working fluid comprises coolant from the vehicle propulsion system.

In a further embodiment the warm working fluid comprises cathode exhaust from the fuel cell.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the disclosure will be seen in the following detailed description, taken in conjunction with the accompanying drawings. The drawings described herein are for illustrative purposes only of selected embodiments and not all possible implementations and are not intended to limit the scope of the present disclosure.

In the drawings.

DETAILED DESCRIPTION

Figure 1:
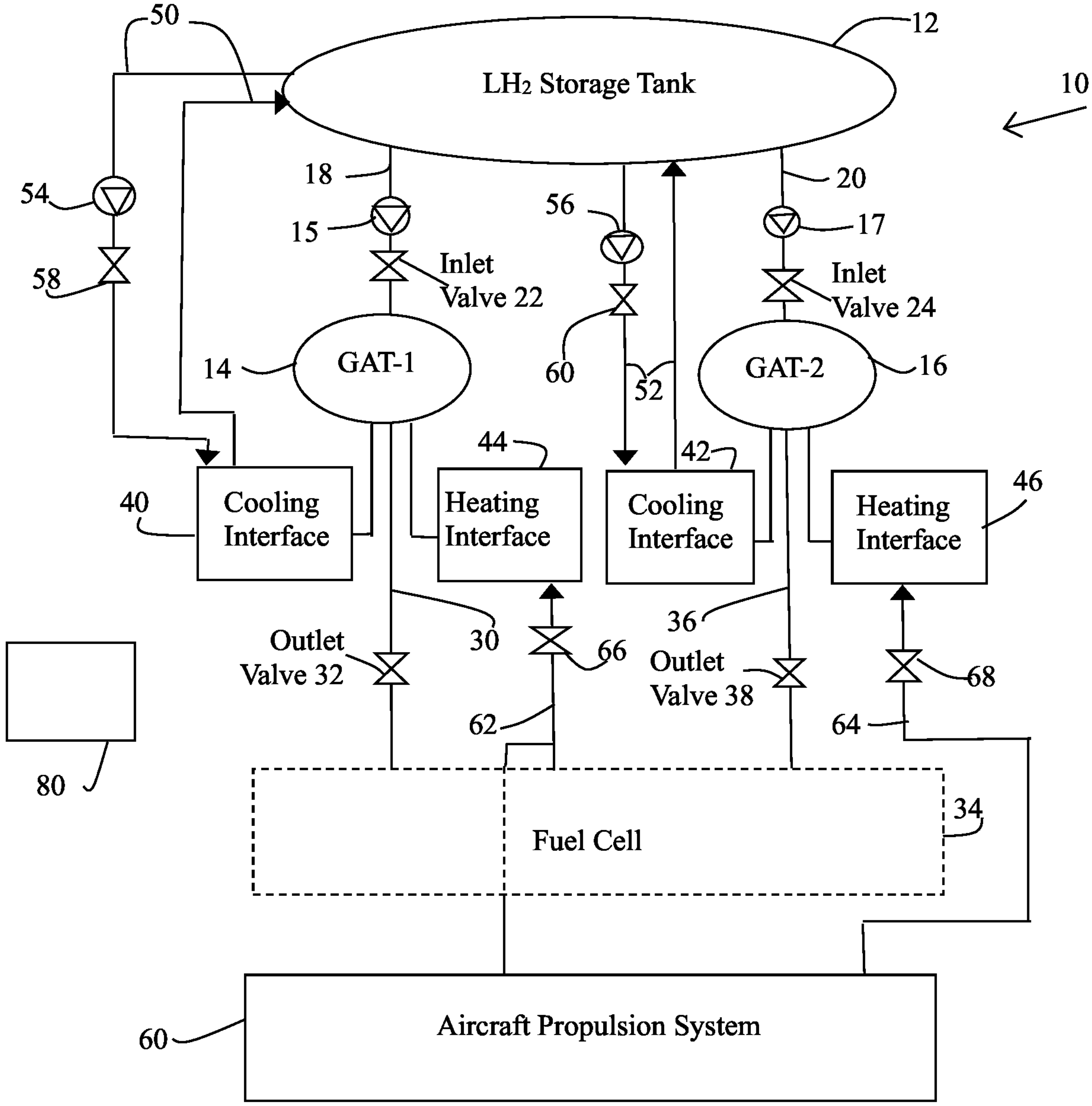
FIG. 1 is a system block diagram showing an embodiment of two GATs per $LH_2$ storage tank in accordance with the present disclosure.

Example embodiments will now be described more fully with reference to the accompanying drawings. Example embodiments are provided so that this disclosure will be thorough and will fully convey the scope to those who are skilled in the art. Numerous specific details are set forth, such as examples of specific components, devices, and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, components, and/or groups, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer, or section from another element, component, region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "bar" is a metric unit of pressure measurement which is equal to 100,000 Pa (100 kPa), or slightly less than the current average atmospheric pressure on Earth at sea level (approximately 1.013 bar, which is about 14.7 pounds per square inch).

Referring to FIG. 1, a $LH_2$ storage tank in accordance with the present disclosure comprises a primary $LH_2$ storage tank 12 configured to hold a quantity of $LH_2$ sufficient to power a fuel cell-powered aircraft for a desired range. Primary $LH_2$ storage tank 12 comprises a dewar tank formed of a relatively light-weight composite material or other form of relatively light-weight insulated cryogenic tank configured to store $LH_2$ at or close to ambient pressure.

$LH_2$ fuel storage system 10 also includes two small high pressure (e.g., 10 bar) gas accumulator tanks (GATs), a first GAT-1 tank 14 and a second GAT-2 tank 16. GAT-1 tank 14 and GAT-2 tank 16 are connected to the main $LH_2$ storage tank 12 via conduits 18 and 20. Flow of $LH_2$ from main $LH_2$ storage tank 12 to GAT-1 tank 14 and GAT-2 tank 16 is controlled by valves 22 and 24, respectively. $LH_2$ from main $LH_2$ storage tank 12 may flow via gravity, or may be pulled into GAT-1 tank 14 and GAT-2 tank 16 via vacuum, or pumped into GAT-1 tank 14 and GAT-2 tank 16 via optional pumps 15 and 17.

GAT-1 tank 14 also includes an outlet conduit 30 connected through outlet valve 32 with the inlet side of fuel cell 34, while GAT-2 tank 16 includes an outlet conduit 36 connected through outlet valve 38 to the inlet side of fuel cell 34. GAT-1 tank 14 and GAT-2 tank 16 are each equipped with cooling interfaces 40 and 42, respectively, and heating interfaces 44 and 46, respectively. Cooling interfaces 40, 42 are configured to allow $LH_2$ circulated from the main tank 12 via conduits 50 and 52, pumps 54 and 56 and valves 58 and 60, respectively, to selectively cool the respective GAT-1 tank 14 and GAT-2 tank 16, as the case may be. Heating interfaces 44, 46 in turn are configured to allow warm fluid from the aircraft propulsion system 60, e.g., coolant from the vehicle propulsion system, or cathode exhaust air from the fuel cells, delivered via conduits 62 and 64 and valves 66 and 68, to selectively heat the contents of the GAT-1 tank 14, GAT-2 tank 16, respectively, as the case may be. Not shown for the ease of simplicity are pressure and temperature gauges and connectors to a controller 80.

In operation, $LH_2$ is circulated through cooling interface 40 of GAT-1 tank 14, chilling GAT-1 tank 14. Inlet valve 22 is opened, and GAT-1 tank 14 is partially filled with $LH_2$. Inlet valve 22 is then closed. The internal pressure of the $LH_2$ in GAT-1 tank 14 is then raised by heat exchange with heating interface 44 which receives heat from the vehicle propulsion system and/or heat from the warm exhaust air from the fuel cell 34. Heating raises the pressure of the $H_2$ in $LH_2$ GAT-1 tank 14 to 10 bar. The $LH_2$ at elevated pressure is then delivered to a downstream gasifier (not shown) and from the gasifier as feed to the fuel cell 34. As $LH_2$ is being delivered from the GAT-1 tank 14, GAT-2 tank 16 is chilled by $LH_2$ from main tank 12. Once chilled, inlet valve 24 is opened, and a quantity of $LH_2$ is allowed to flow from main tank 12 to refill GAT-2 tank 16. The $LH_2$ in GAT-2 tank 16 is then heated by heat exchange with warm exhaust air from the fuel cell 34 to raise the pressure $H_2$ in $LH_2$ in GAT-2 tank 16 to 10 bar. GAT-2 tank 16 operates in parallel but out-of-phase with GAT-1 tank 14 so that there is an uninterrupted supply of $LH_2$ at a desired pressure, typically 10 bar, to the gasifier.

Figure 2:
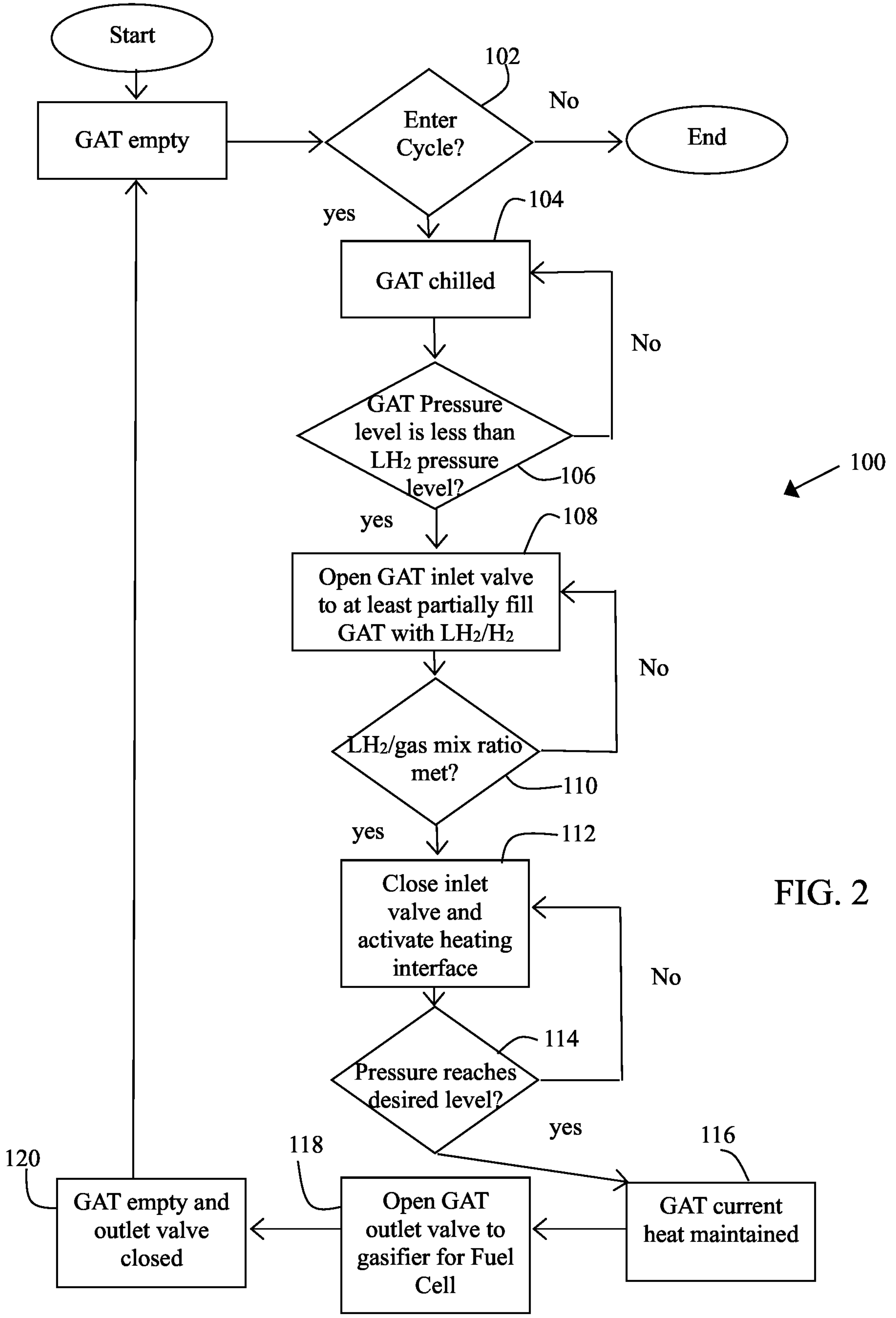
FIG. 2 is a flow chart illustrating a complete cycle of a single GAT in accordance with the present disclosure.

FIG. 2 depicts an operation of one complete cycle for a single GAT in accordance with the present disclosure. As will be appreciated, while the first GAT, e.g., GAT-1, is delivering conditioned $LH_2$ to the gasifier at an elevated pressure, the second GAT, i.e., GAT-2, can be recharged and pressurized for subsequent use in delivering pressurized $LH_2$ to the gasifier.

FIG. 2 is a flow chart 100 illustrating one complete cycle for a single GAT in accordance with the present disclosure. The cycle begins (block 102) with an empty GAT. The empty GAT is chilled by heat transfer with $LH_2$ from the main $LH_2$ storage fuel tank (block 104). Upon sensing the internal pressure level of the GAT as being less than the internal pressure level of the $LH_2$ storage tank (block 106), the GAT inlet valve is opened and a quantity of $LH_2$ is transferred from the main $LH_2$ storage tank to the GAT to at least partially fill the GAT with $LH_2$ from the main $LH_2$ storage fuel tank (block 108), and achieve a desired $LH_2$/gas mixture ratio (block 110). When sufficient $LH_2$ is transferred to the GAT, the inlet valve to the GAT is closed and the GAT is heated to raise the pressure of the $H_2$ in the GAT to a working pressure suitable for feeding to the fuel cell by heat transfer with warm working fluid from the fuel-cell-powered vehicle (block 112). Once the pressure of the $LH_2$ in the GAT reaches a desired level (block 114), the heating of the GAT is maintained (block 116) and the GAT outlet is opened to permit flow of the pressurized gasified $H_2$ to the fuel cell (block 118). Once the GAT is largely emptied, the GAT outlet valve is closed (block 120) and the cycle is repeated.

Figure 3:
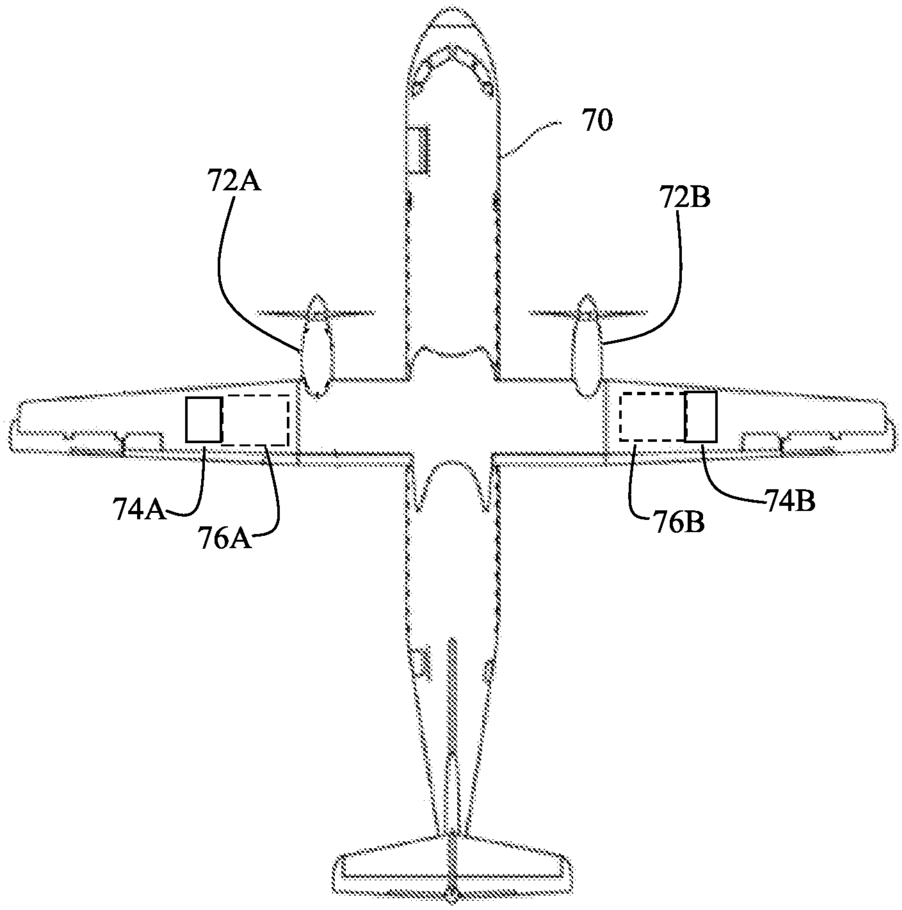
FIG. 3 illustrates a $LH_2$ storage tank installed in an airplane in accordance with the present disclosure.

FIG. 3 illustrates a $LH_2$ storage tank installed in an airplane in accordance with the present disclosure. Airplane 70 includes electric motors 72A, 72B which are supplied with electric power by parallel fuel cell systems 74A, 74B for driving electric motors 72A, 72B and for powering other instruments and subsystems of the airplane. The airplane also has fuel tank systems 76A, 76B, comprising main fuel tanks and GATs in accordance with the present disclosure as illustrated above in FIGS. 1 and 2.

It is thus seen the disclosed system provides the ability to achieve superior mass fractions and source redundancy without the need for a complex $LH_2$ pump system. It also allows to fully utilize the cooling capacity of the $LH_2$ to reduce the thermal rejection requirements of the aircraft systems such as the aircraft propulsion system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. By way of example, but not limitation, one or more thermally-pumped GATs as above described can be employed. In one embodiment with only one GAT employed, the supply of $LH_2$ at elevated pressure to the fuel cell will be discontinuous, which would be acceptable for intermittent applications, e.g., to boost glide vehicles, or for battery charging. In another embodiment, three or more GATs may be provided to sequentially alternate outputs to provide a continuous supply of pressure-conditioned $H_2$. The number of GATs needed can be determined by the ratio of fill-and-pressurize time to supply time. Also, the heating interfaces can use heat from other parts of the fuel cell aircraft, e.g., coolant from the vehicle propulsion system, for heating the GAT(s). And control of the flow valves and pumps, etc., can be automated or manual. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof.

What is claimed:

1. A liquid hydrogen ($LH_2$) fuel storage system for a fuel cell-powered vehicle, comprising a main $LH_2$ storage fuel tank configured for close to ambient pressure storage of $LH_2$, and one or more gas accumulator tanks (GATs) smaller than the main fuel tank and configured for elevated pressure storage of $LH_2$ and for feeding pressurized $LH_2$ to the fuel cell, wherein the one or more GATs each have a cooling interface configured to cool the GAT employing $LH_2$ from the main fuel tank, and a heating interface configured to heat contents of the GAT with warm working fluid from the fuel cell-powered vehicle whereby to raise pressure of the $LH_2$ in the GAT to a working pressure for feeding the $LH_2$ to the fuel cell.

2. The $LH_2$ fuel storage system of claim 1, wherein the main $LH_2$ storage fuel tank comprises a composite structure.

3. The $LH_2$ fuel storage system of claim 1, wherein the vehicle is an airplane.

4. The $LH_2$ fuel storage system of claim 1, comprising two or more GATs configured to run out-of-phase with one another.

5. The $LH_2$ fuel storage system of claim 1, wherein the working pressure is 5-10 bar.

6. The $LH_2$ fuel storage system of claim 1, wherein the warm working fluid comprises coolant from a vehicle propulsion system.

7. The $LH_2$ fuel storage system of claim 1, wherein the warm working fluid comprises cathode exhaust from the fuel cell.

8. A method for providing liquid hydrogen ($LH_2$) fuel to a fuel cell-powered vehicle, comprising the steps of:

(a) providing $LH_2$ fuel storage system as claimed in claim 1, the system including a main $LH_2$ storage fuel tank configured for close to ambient pressure storage of $LH_2$ and one or more gas accumulator tanks (GATs) smaller than the main fuel tank and configured for storage of $LH_2$ and feeding of pressurized $LH_2$ to the fuel cell;

(b) cooling the one or more GATs by heat transfer with $LH_2$ from the main $LH_2$ storage fuel tank;

(c) transferring a quantity of $LH_2$ from the main $LH_2$ storage fuel tank to a cooled GAT and raising pressure of the $LH_2$ in the cooled GAT to a working pressure suitable for feeding the fuel cell by heat transfer with warm working fluid from the fuel cell-powered vehicle; and (d) feeding the $LH_2$ at working pressure to the fuel cell.

9. The method of claim 8, wherein two or more GATs are provided, wherein steps (a), (b), (c) and (d) are sequentially applied to the two or more GATs out-of-phase with one another.

10. The method of claim 8, wherein each GAT is first cooled by thermal transfer with $LH_2$ from the main $LH_2$ storage fuel tank, a quantity of $LH_2$ is then transferred from the main fuel tank to the cooled GAT, and the contents of the cooled GAT are heated by heat exchange with warm working fluid from the fuel cell-powered vehicle, whereby to raise a pressure of the $LH_2$ in the GAT to a working pressure, and the $LH_2$ is delivered to the fuel cell at working pressure.

11. The method of claim 8, wherein the vehicle comprises an aircraft.

12. The method of claim 8, wherein the working pressure is 5 to 10 bar.

13. The method of claim 8, wherein the warm working fluid comprises coolant from the vehicle propulsion system.

14. The method of claim 8, wherein the warm working fluid comprises cathode exhaust from the fuel cell.

* * * * *